(12) United States Patent
Mann

(10) Patent No.: US 6,625,675 B2
(45) Date of Patent: Sep. 23, 2003

(54) PROCESSOR FOR DETERMINING PHYSICAL LANE SKEW ORDER

(75) Inventor: Gregory J. Mann, Colchester, VT (US)

(73) Assignee: International Business Machines Corporation, Armonk, NY (US)

( * ) Notice: Subject to any disclaimer, the term of this patent is extended or adjusted under 35 U.S.C. 154(b) by 327 days.

(21) Appl. No.: 09/816,969

(22) Filed: Mar. 23, 2001

(65) Prior Publication Data

US 2002/0138675 A1 Sep. 26, 2002

(51) Int. Cl.[7] .................................................. G06F 3/00
(52) U.S. Cl. .......................... 710/61; 710/52; 710/118; 713/400; 713/600
(58) Field of Search .............................. 710/10, 29, 52, 710/58, 60, 61, 118; 713/1, 400, 401, 503, 600; 712/215

(56) References Cited

U.S. PATENT DOCUMENTS

| | | | |
|---|---|---|---|
| 4,593,281 A | | 6/1986 | Lare |
| 4,701,913 A | | 10/1987 | Nelson |
| 4,748,637 A | * | 5/1988 | Bishop et al. ................. 375/7 |
| 4,951,225 A | * | 8/1990 | Lee et al. ..................... 364/513 |
| 5,148,453 A | * | 9/1992 | Newby et al. ............... 375/116 |
| 5,175,819 A | | 12/1992 | Le Ngoc et al. |
| 5,212,686 A | | 5/1993 | Joy et al. |
| 5,519,877 A | * | 5/1996 | Yoneda et al. ............... 395/800 |
| 5,715,248 A | | 2/1998 | Lagle, III et al. |
| 5,721,891 A | * | 2/1998 | Murray et al. ............... 713/600 |
| 6,005,985 A | * | 12/1999 | Brison et al. ................ 382/278 |
| 6,014,613 A | * | 1/2000 | Dati et al. ................... 702/190 |
| 6,154,797 A | | 11/2000 | Burns et al. |

FOREIGN PATENT DOCUMENTS

| | | |
|---|---|---|
| EP | 0 659 001 A2 | 12/1994 |
| EP | 0 982 898 A1 | 3/2000 |
| JP | 4-61528 | 2/1992 |

OTHER PUBLICATIONS

International Search Report.
Infiniband Trade Association: "InfiniBand Architecture. Specification vol. 1 and 2. Release 1.0", Infiniband Trade Association, Oct. 24, 2000, XP002202923.
IBM Corporation, "Data Funnel For Connection of Multiple Channel Types", IBM Technical Disclosure Bulletin, vol. 32, No. 2, Jul., 1989, pp. 54–55.
PCT Written Opinion, International application No. PCT/GB02/01291, Mar. 5, 2003, pp. 1–5.
Infiniband Trade Association, "Infiniband Conceptual Overview" –XP–002202923, Specification, vol. 1 and 2. Release 1.0 Infiniband Trade Association, Oct. 24, 2000, pp. 33–36, 98–102, 126–131.

* cited by examiner

*Primary Examiner*—Jeffrey Gaffin
*Assistant Examiner*—Rijue Mai
(74) *Attorney, Agent, or Firm*—McGinn & Gibb, PLLC; Richard A. Henkler, Esq.

(57) ABSTRACT

In parallel-serial architecture based networks that include a transmission media and at least one I/O processor connected to the transmission media by a core, a buffering device is provided that compensates for different latencies from all physical lanes in data links so that data transmission occurs at the same time in the receive path of the I/O "processor." The processor can be an I/O device for a host channel adapter, a target channel adapter, or an interconnect switch in an InfiniBand-type network.

20 Claims, 7 Drawing Sheets

PROCESSOR FOR DETERMINING PHYSICAL LANE SKEW ORDER

BACKGROUND OF THE INVENTION

1. Field of the Invention

The present invention generally relates to input/output (I/O) data transmission devices, and more particularly to first-in-first-out (FIFO) buffer devices in I/O data transmission paths that compensates for lane skew order.

Description of the Related Art

Figure 1A:
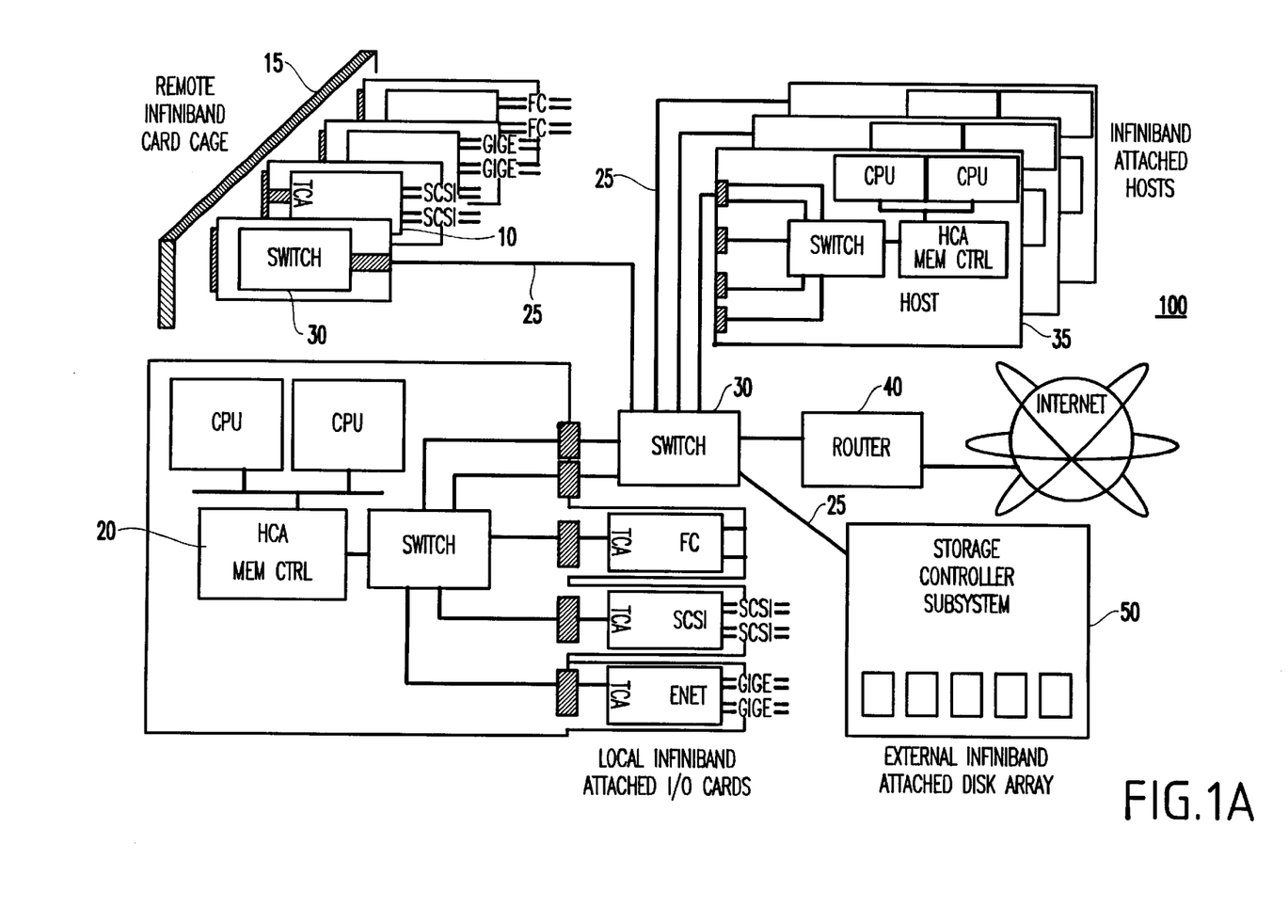
FIG. 1a shows a schematic diagram of an exemplary InfiniBand network in which the device of the invention is preferably used.

InfiniBand (registered Trademark of the InfiniB and Trade Association, Portland, Oreg.) architecture is a new common I/O specification to deliver a channel based, switched-fabric technology that the entire hardware and software industry can adopt. A network and components associated with an InfiniBand network 100 are shown in FIG. 1a. InfiniBand based networks are designed to satisfy bandwidth-hungry network applications, such as those combining voice, data, and video on the Internet. InfiniBand architecture is being developed by the InfiniBand Trade Association that includes many hardware and software companies. Its robust layered design enables multiple computer systems and peripherals to work together more easily as a single high-performance and highly available server.

Being a fabric-centric, message-based architecture, Infini-Band is ideally suited for clustering, input/output extension, and native attachment in diverse network applications. InfiniBand technology can be used to build remote card cages 15 or connect to attached hosts 35, routers 40, or disk arrays 50. InfiniBand also features enhanced fault isolation, redundancy support, and built-in failover capabilities to provide high network reliability and availability. Featuring high-performance and reliability, these devices provide solutions for a range of network infrastructure components, including servers and storage area networks.

Figure 1B:
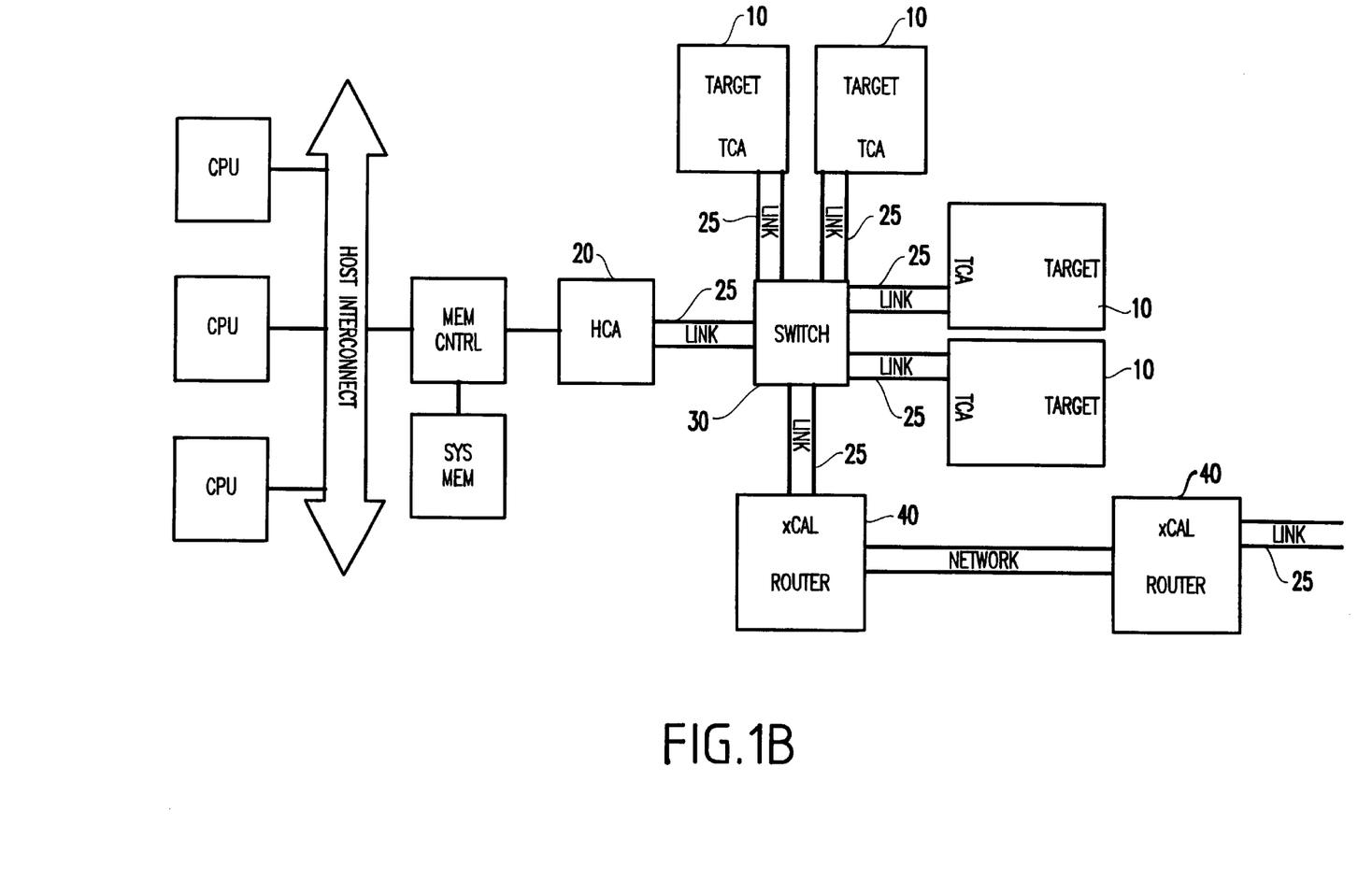

In FIG. 1b, a block diagram is shown in exemplary form of InfiniBand components in a portion of the network shown in FIG. 1a. These components have input/output interfaces, each forming part of a target channel adapter (TCA) 10, host channel adapter (HCA) 20, an interconnect switch device 30, and routers 40, each that have application specific integrated circuits (ASIC) core interfaces that include Infini-Band Technology Link Protocol Engine (IBT-LPE) cores that connect ASICs between each of these components through links 25 in an InfiniBand Technology (IBT) network 100. The IBT-LPE core supports a range of functionality that is required by all IBT devices in the upper levels of the physical layer and the lower link layer. It also handles the complete range of IBT bandwidth requirements, up to and including a 4-wide link operating at 2.5 gigabits per second. The IBT-LPE core (large integrated circuit design) in the upper levels of the physical layer and the link layer core of the ASIC comply with standards established by the Infini-Band Trade Association in the IBTA 1.0 specifications (2001). Such architectures decouple the I/O subsystem from memory by using channel based point to point connections rather than shared bus, load and store configurations.

The TCA 10 provides an interface for InfiniBand-type data storage and communication components. Creating InfiniBand adapters that leverage the performance benefits of the InfiniBand architecture is accomplished through a cooperative, coprocessing approach to the design of an InfiniBand and native I/O adapter. The TCA 10 provides a high-performance interface to the InfiniBand fabric, and the host channel communicates with a host based I/O controller using a far less complex interface consisting of queues, shared memory blocks, and doorbells. Together, the TCA and the I/O controller function as an InfiniBand I/O channel deep adapter. The TCA implements the entire mechanism required to move data between queues and to share memory on the host bus and packets on the InfiniBand network in hardware. The combination of hardware-based data movement with optimized queuing and interconnect switch priority arbitration schemes working in parallel with the host based I/O controller functions maximizes the InfiniBand adapter's performance.

The HCA 20 enables connections from a host bus to a dual 1× or 4× InfiniBand network. This allows an existing server to be connected to an InfiniBand network and communicate with other nodes on the InfiniBand fabric. The host bus to InfiniBand HCA integrates a dual InfiniBand interface adapter (physical, link and transport levels), host bus interface, direct memory target access (DMA) engine, and management support. It implements a layered memory structure in which connection-related information is stored in either channel on-device or off-device memory attached directly to the HCA. It features adapter pipeline header and data processing in both directions. Two embedded Infini-Band microprocessors and separate direct memory access (DMA) engines permit concurrent receive and transmit data-path processing.

The interconnect switch 30 can be an 8-port 4× switch that incorporates eight InfiniBand ports and a management interface. Each port can connect to another switch, the TCA 10, or the HCA 20, enabling configuration of multiple servers and peripherals that work together in a high-performance InfiniBand based network. The interconnect switch 30 integrates the physical and link layer for each port and performs filtering, mapping, queuing, and arbitration functions. It includes multicast support, as well as performance and error counters. The management interface connects to a management processor that performs configuration and control functions. The interconnect switch 30 typically can provide a maximum aggregate channel throughput of 64 gigabits, integrates buffer memory, and supports up to four data virtual lanes (VL) and one management VL per port.

Figure 2:
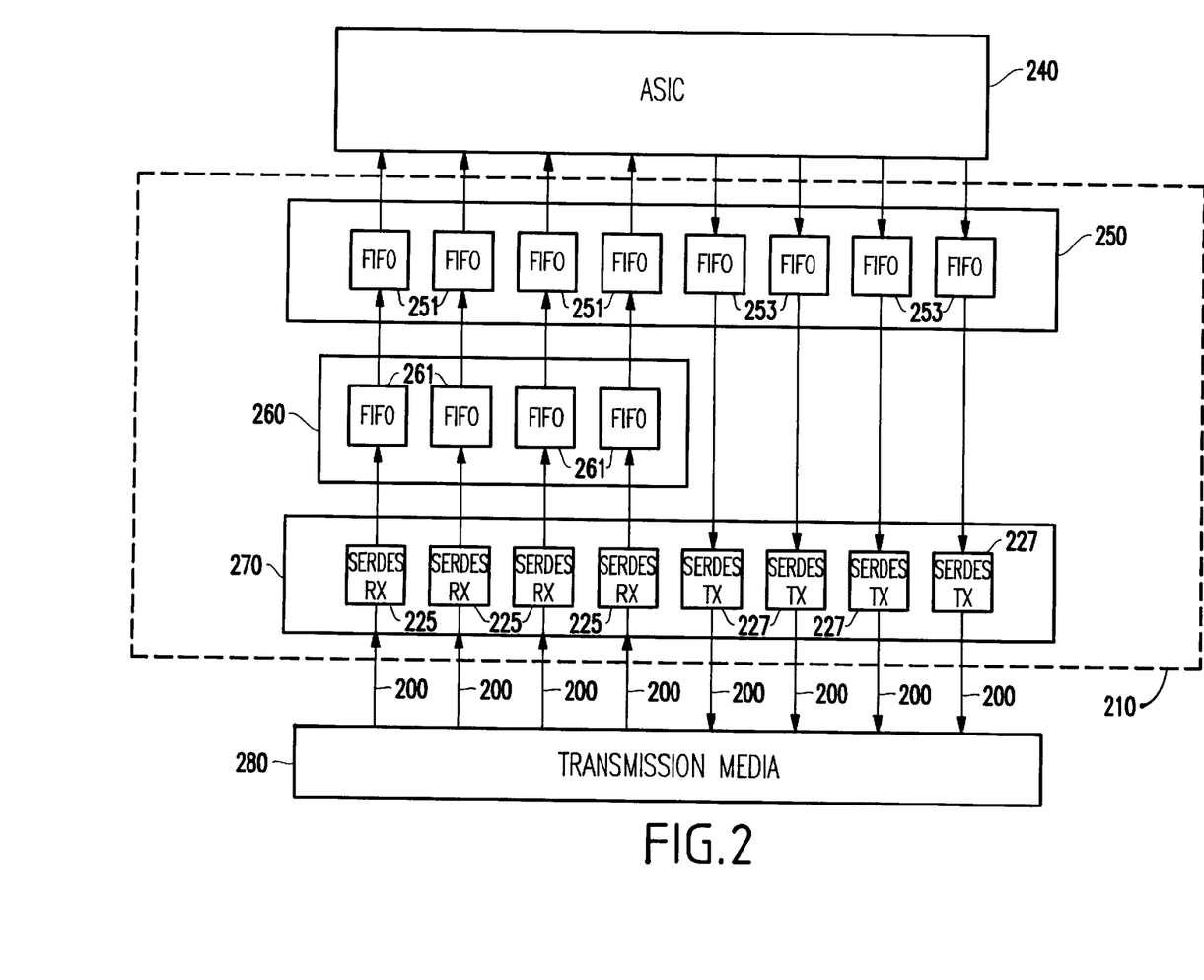
FIG. 2 is a schematic diagram of a core that provides transmission between an ASIC and a transmission media.

FIG. 2 illustrates the core logic 210 that connects an InfiniBand transmission media 280 (the links 25 shown in FIG. 1b) to an application specific integrated circuit (ASIC) 240 (such as the TCA 10, the HCA 20, the switch 30, the router 40, etc. as shown in FIG. 1b). The core logic 210 illustrated in FIG. 2 is improved using the invention described below. However, the core logic 210 shown in FIG. 2 is not prior art and may not be generally known to those ordinarily skilled in the art at the time of filing of this invention. Received data through SERDES 225 over the lanes 200 in the data links can be in data packets.

To accommodate the different speeds of the data signals being handled, the core logic 210 includes a serialization portion 270 that includes the serialization/deserialization (SERDES) units 225. The structure and operation of such serialization/deserialization units is well known to those ordinarily skilled in the art and such will not be discussed in detail herein so as not to unnecessarily obscure the salient features of the invention.

The InfiniBand transmission media 280 is made up of a large number of byte-striped serial transmission lanes 200 that form the links 25. The receive serialization/deserialization units 225 deserialize the signals from the transmission media 280 and perform sufficient conversion to a frequency that is acceptable to the core logic 210. For example, if the serialization/deserialization receive units 225 operate to deserialize 10 bits at a time, a 10-to-1 reduction occurs that reduces the 2.5 gigabit per second speed on the transmission media 280 into a 250 MHz frequency that is acceptable to the core logic 210.

The core logic 210 also includes a data control unit 260. The frequency of the signal propagating along the transmission media 280 may not always occur at this wire speed, but instead may be slightly above or below the desired frequency (e.g., by up to 100 parts per million) or control proper data transmit to the upper link layer that is synchronized. This inconsistency in the frequency is transferred through the serialization/deserialization units 225. The data control unit 260 includes FIFO buffers 261 that buffer the data being received by the serialization/deserialization units (SERDES) 225 so as to provide the signal in a uniform 250 MHz frequency to the upper layer logic 250.

The upper link layer logic 250 includes additional FIFO buffers 251 that convert the frequency of the signal output from the frequency correction unit 260 into a frequency that is acceptable to the ASIC 240. During transmission of a signal from the ASIC 240 to the transmission media 280, the process is reversed and the upper link layer logic 250 use FIFO buffers 253. The serialization unit 270 uses other transmission serialization/deserialization units 227. Note that no correction is required by the frequency correction unit 262 for signals that are being transmitted to the transmission media 280 because the ASIC 240 generally produces a signal that does not need to be corrected.

One disadvantage of current "parallel-serial" type architectures include latency differences between the transmission media 280 and receive buffering devices 261. This problem requires a core that includes a controller for a receive buffer device that compensates for these different latencies such that detection of pieces of the data from all physical lanes 200 in the data links that occur in data packets from all physical lanes 200 are received at the same time.

SUMMARY OF THE INVENTION

The present invention resolves the above problem in "parallel-serial" architectures that include a transmission media and at least one I/O processor connected to the transmission media by providing a core that communicates with a remote transmitter processor using a training sequence protocol. A buffering device compensates for different latencies from all physical lanes in data links so that data transmission occurs at the same time in the receive path of the I/O "processor." The processor can be an I/O device for a host channel adapter, a target channel adapter, or an interconnect switch.

The core includes a logic layer connected to the processor, serial lanes connecting the logic layer to the transmission media, and receive and transmit buffers within the serial lanes. The receive buffers have a control to correct for fluctuations in the transmission media and alters the signals being processed along the serial lanes to compensate for different latencies from all physical lanes in the data links so that data transmission occurs at the same time. The invention can be part of a processor that includes serializer/deserializers within the serial lanes. The receive buffers are preferably elastic first-in, first-out (FIFO) buffers and are external to the upper logic layer.

In another embodiment, the invention encompasses a parallel-serial architecture communication system that compensates for different latencies in data lanes of the system. The system includes a parallel-serial transmission media, a processor in communication with the transmission media, a plurality of serial lanes providing data from the transmission media to the processor, buffers interposed along each of the serial lanes, and training logic connected to the buffers. Upon receiving a data communication from the transmission media, the training logic pauses each of the buffers until all of the buffers are synchronized. The training logic simultaneously restarts the buffers after the buffers are synchronized.

The training logic operates on a training sequence contained within the data communication. The training logic also includes an AND gate that determines when all of the buffers have reached a predetermined point in the training sequence. The training logic stops data processing through each of the buffers until all of the buffers reach the predetermined point in the training sequence. When all of the buffers reach the predetermined point in the training sequence, all of the buffers are simultaneously restarted. The training sequence includes an initial training sequence identifier and a final training sequence identifier. The final training sequence identifier is the aforementioned "predetermined point".

The training sequence also includes a predetermined data stream between the initial training sequence identifier and the final training sequence identifier. The training logic allows each of the buffers to reach the predetermined point only when a training quantity (equal to a number greater than a maximum skew value between adjacent ones of the data lanes) of the data stream has been processed by each of the buffers.

The invention also includes a method of compensating for different latencies in data lanes in a parallel-serial architecture. The method receives a data communication from a transmission media, provides the data communication to buffers interposed along a plurality of serial lanes, pauses each of the buffers until all of the buffers are synchronized, simultaneously restarts the buffers after the buffers are synchronized, and forward synchronized data from the buffers to a processor.

The pausing process is based on a training sequence contained within the data communication and determines when all of the buffers have reached a predetermined point in the training sequence. The invention stops data processing through each of the buffers until all of the buffers reach the predetermined point in the training sequence. When all of the buffers reach the predetermined point in the training sequence, the invention restarts all of the buffers simultaneously.

The training sequence includes an initial training sequence identifier and a final training sequence identifier (e.g., the predetermined point). The training sequence also includes a predetermined data stream between the initial training sequence identifier and the final training sequence identifier. The invention allows each of the buffers to reach the predetermined point only when a training quantity (a number greater than a maximum skew value between adjacent ones of the data lanes) of the data stream has been processed by each of the buffers.

Thus, the invention performs a training sequence to correct skew between the physical lanes. The training sequence pauses each of the FIFO buffers at the same point in the training process. Once trained, all buffers are then simultaneously restarted to allow the FIFO buffers to be synchronized in their data transmission.

BRIEF DESCRIPTION OF THE DRAWINGS

The foregoing and other objects, aspects and advantages will be better understood from the following detailed description of a preferred embodiment(s) of the invention with reference to the drawings, in which:

FIG. 1b is a portion of the network with components as shown in FIG. 1a;

FIG. 3b is a flow diagram for determining physical lane skew order in the core as to the deskew logic counter shown in FIG. 3a;

FIG. 4b is a flow diagram for determining lane skew order in FIG. 4a.

DETAILED DESCRIPTION OF PREFERRED EMBODIMENTS OF THE INVENTION

As mentioned above, there is a need for a receive buffering device that compensates for different latencies from all physical lanes 200 in data links, so that data transmission occurs at the same time in the receive path of the ASIC 240. The invention uses an exemplary processor shown in FIG. 2 (which is shown in greater detail in FIG. 3a) that includes deskew logic counters 275 that cooperatively control the elastic buffering devices 261. The lane deskew counters 275 are replicas for each lane required in the receiving processor. In InfiniBand components, typically one, four or twelve lanes are used on the receive data paths (note only four exemplary lanes are shown in FIG. 2). Each of the elastic buffering devices 261 reside between the upper link layer logic 250 and the lower link layer 270. In "parallel-serial" architectures, individual serial lanes 200 may have differing latency from the transmission media 280 to respective receive data transmission buffer devices 261. Thus, the receiver section of the core 210 compensates for the different latencies. The receiver section 210 can detect pieces of the data from all physical lanes 200 that are transmitted at the same time from a remote transmitting processor (e.g., an HCA 20, switch 30 etc.).

Figure 3A:
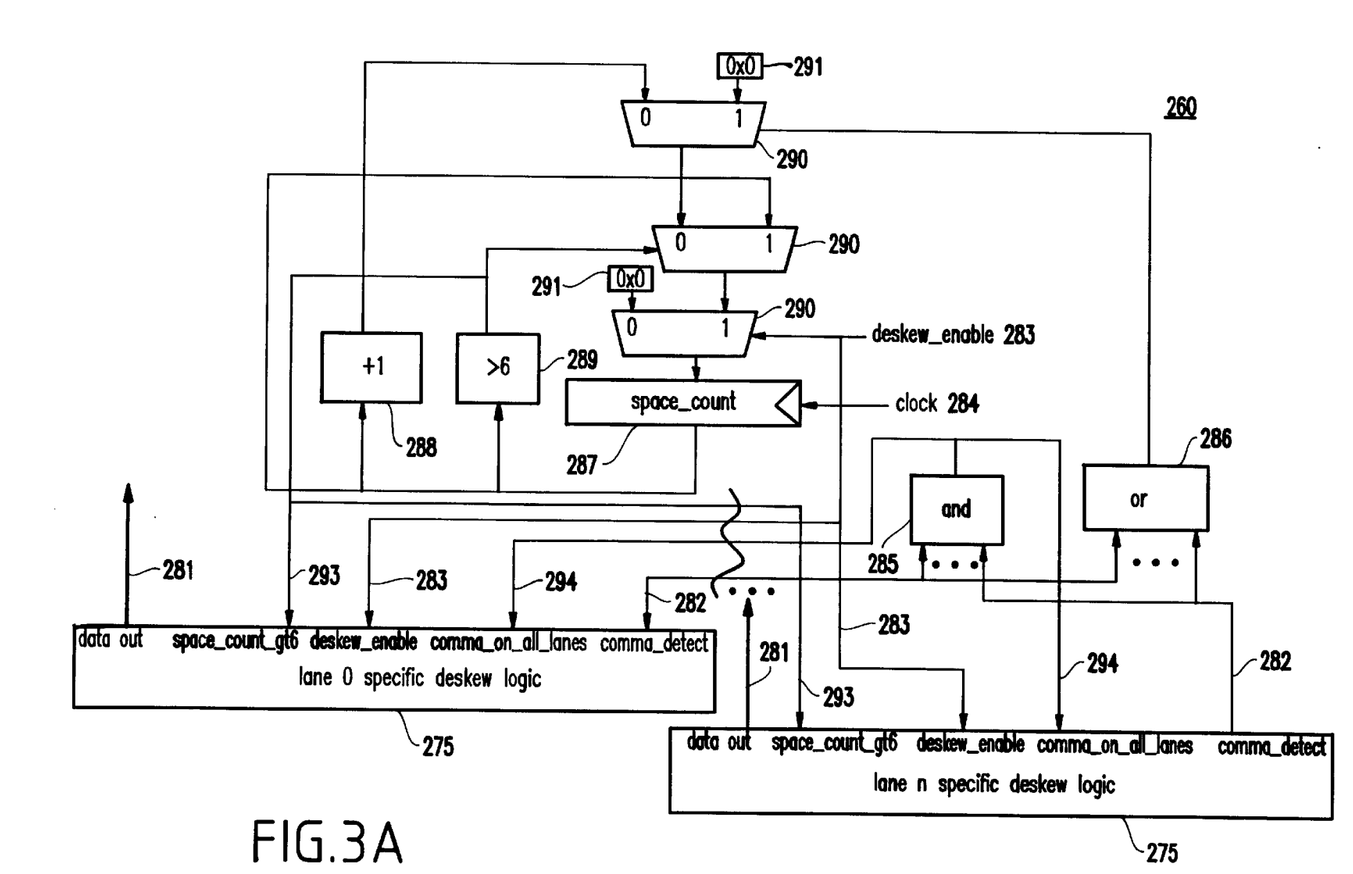
FIG. 3a is a diagram of deskew logic counter of the core.

Referring now to FIG. 3a, a deskew logic counters 275 is implemented in the invention as part of the frequency correction and data control unit 260. This design is shown for lane "0" and lane "n" only in the receive data path of the processor shown in FIG. 2 (the intervening lanes are omitted for clarity and would be replicated for each receive lane). Each of the deskew logic counters 275 includes an AND gate 285 and OR gate 286 with input signals as shown. A box labeled "+1" 288 increments input form a space_count latch register 287. A box labeled ">6" 289 indicates whether input is greater than six. The 0x1 boxes are selectors 290 that perform the necessary select signal control function. The 0x0 labeled boxes 291 input a zero value into the selectors 290 when selected and passed to the space_count latch register 287 to be zero. When a path to a 0x0 box 290 is selected, it loads the space_count register 287 with all zeros.

A data_out signal 281 includes data from a FIFO 261 for lane 0. A comma_detect signal 282 asserts '1' if a byte on data_out 281 from the particular FIFO 261 is a "comma." A deskew_enable signal 283 enables the counter 275 from upper layer logic 250 to deskew the receive lanes 200. A clock signal 284 is provided by a clock signal from the upper layer logic 250. The comma_detect signal 292 for each lane having a specific deskew logic signal 292 provides the necessary logic that binds all of the lane specific deskew logic counters 275 together. This signal comes from the comma_detect output on the specific deskew logic counter 275 for a specified lane n. A space_count_gt6 signal 293 provides an indication from central deskew logic that its space_count_indication is greater than six. A comma_on_all_lanes signal 294 provides indication from the central deskew logic that all lanes have a comma on respective data_out signal 281.

Figure 3B:
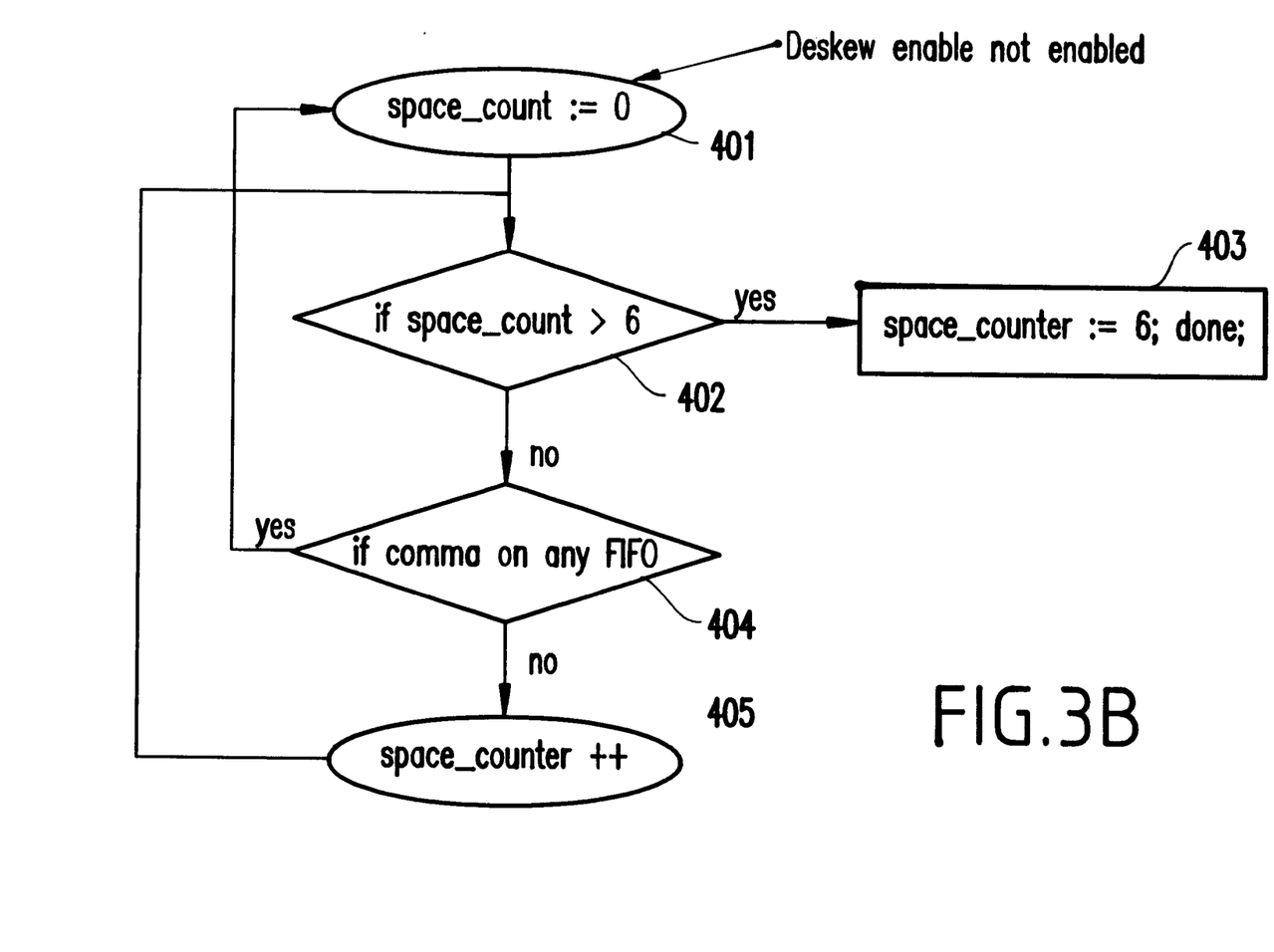

Referring now to FIG. 3b, the operation of the structure shown in FIG. 3a is explained with reference to the flow diagram for determining physical lane skew order in the core 210 using the deskew counters 275. The "deskew not enable" command 401 corresponds to the signal 283 for each lane used labeled "space_count:=0" that loads the space_count register 287 with a zero value. If the decision logic step 402 labeled "space_count>6," is satisfied, then the latch register 287 is loaded with 6 at step 403. Next step 404 detects whether a "comma" is on any FIFO 261. If so, then space count latch register 287 returns to the beginning step 401 and starts the process again. If not, the second command step 405 labeled "space_counter++" increments the space_count register 287 by one and returns to step 402.

Each of the elastic buffer devices 261 on the receive path of the core 210 is controlled by a process in the upper link layer logic 250 that includes a controller including the deskew counter 275 that counts symbol times in which a "comma" symbol has not been detected on any of the receiving physical lanes 200. If that counter 275 reaches a value of 7 (the maximum amount of skew between any two physical lanes is 6 symbol times) or higher, the next "comma" symbol detected is the earliest physical lane to be deskewed. The invention stops taking data from that physical lane FIFO 261, and from each FIFO 261 where a "comma" is detected, until all lanes 200 have a "comma" symbol at the FIFO 261 output.

In other words, the invention performs a training sequence to correct skew between the physical lanes. The training sequence pauses each of the FIFO buffers at the same point in the training process. Once trained, all buffers are then simultaneously restarted to allow the FIFO buffers to be synchronized in their data transmission.

The training sequence comprises an initial comma followed by a specific number of bytes of data (e.g., 15 bytes of data), followed by a final comma. The data is essentially meaningless and is not used, but does function as a placeholder within the memory locations of the FIFO buffers. This allows all memory locations within each of the buffers to be full when the meaningful data begins to be transmitted, and maintains the synchronization of the FIFO buffers operations.

In operation, an external device, such as an HCA 20, switch 30, etc. sends data preceded by a training sequence. The format of the training sequence matches a predetermined standard (e.g., an initial comma, followed by 15 bytes of meaning less data, followed by a final comma). The initial commas represent the beginning of the training sequence and the final commas represent the end of the training sequence. The meaningless 15 bytes of data is greater than the size of the buffers and allows all memory locations within the FIFO buffers to be completely full when the second set of commas (representing the end of the training sequence) are received.

When the end of the training sequence is identified, each FIFO buffers is stopped until all FIFO buffers received the training end comma. Once all FIFO buffers have received the training end comma, all FIFO buffers are simultaneously restarted. This allows all FIFO buffers to begin the process of sequentially passing data within their internal memory locations at the same time, which synchronizes the output of the FIFO buffers. Once the meaningless training data is cleared out of the memory locations of the FIFO buffers, actual data transmission will take place.

To train a set of physical lanes, the FIFOs on each lane are monitored to determine when all FIFOs have receive comma, which represents the beginning of a training sequence. When the training sequence (all commas) has been received by all FIFOs, the FIFOs are started and the number of cycles since the beginning of the training sequence is counted. As shown in FIG. 3b, the data byte count that occurs after the first comma is received, must exceed the maximum amount of skew that is possible between any two physical lanes. After that count is reached by each FIFO, the FIFO then looks for the final comma. Once that final comma is received by the FIFO, the FIFO stops receiving data until all other FIFOs also received the final comma. Once all FIFOs receive the final comma, the invention simultaneously begins meaningful data input into all lane FIFOs, which allows the meaningful data output from the FIFOs to be synchronized without skew.

Figure 4A:
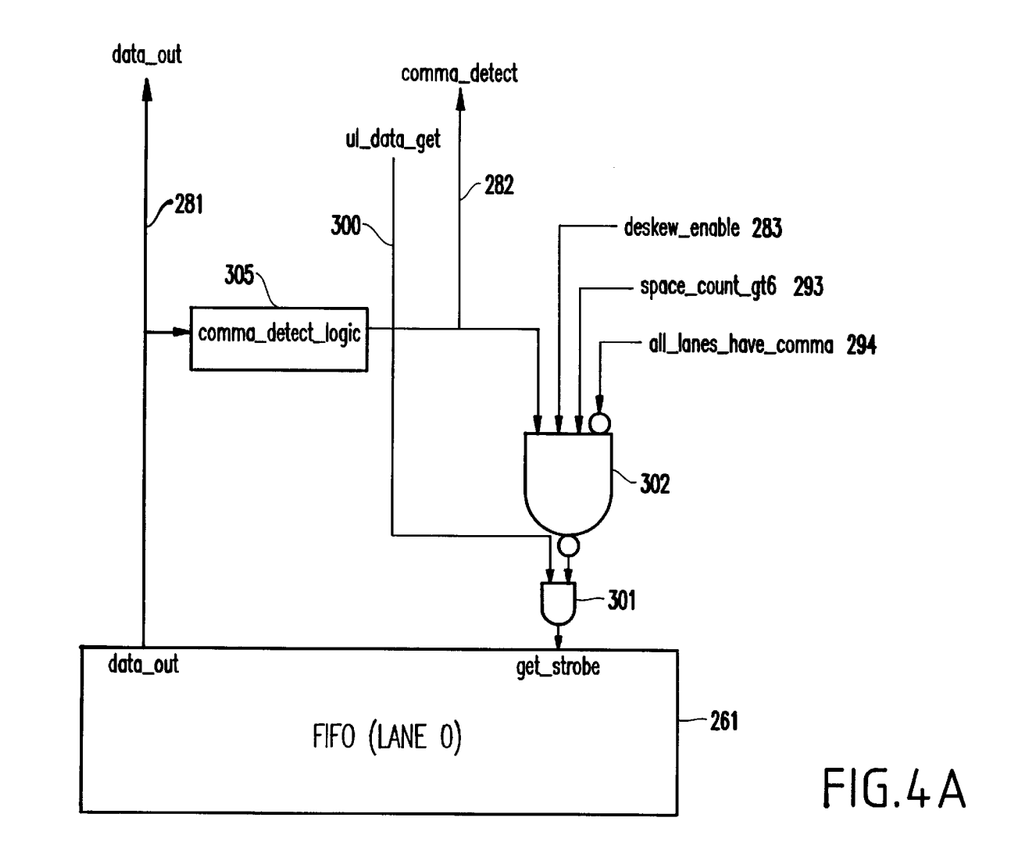
FIG. 4a is a schematic diagram of a lane specific deskew logic counters used to implement the invention.

This is shown in FIG. 4a, where one of the elastic FIFO's 261 with the related deskew logic counter 275 for lane "0" is shown. This architecture is replicated in the core for each receive serial lane used. A comma_detect_logic section 305 comprises a logic section that determines if the data_out signal 281 for a particular lane is a comma symbol. The "comma" symbol is also the start of a training sequence. The data_out signal 281 includes data from the FIFOs 261 for that particular lane. The comma_detect signal 282 asserts '1' if a byte on data_out 281 is a "comma." An "upper layer (ul)_data_get" signal 300 from the upper layer logic 250 is an input signal for a particular lane as to a pause signal, that in turn is input to AND gate 301 that also receives a complimented signal from NOR gate 302. The NOR gate 302 receives and combines logically signals from: the deskew_enable signal 283 that enables the deskew logic to operate; the all_lanes_have_comma signal 294 that provides an indication from the deskew logic counter 275 that all lanes have a "comma" on respective data_out signals 281 from each FIFO 261 on the receive data path; and the space_count_gt6: signal 293 provides indication from the deskew logic counters 275 that its space_count_indication is greater than six.

Figure 4B:
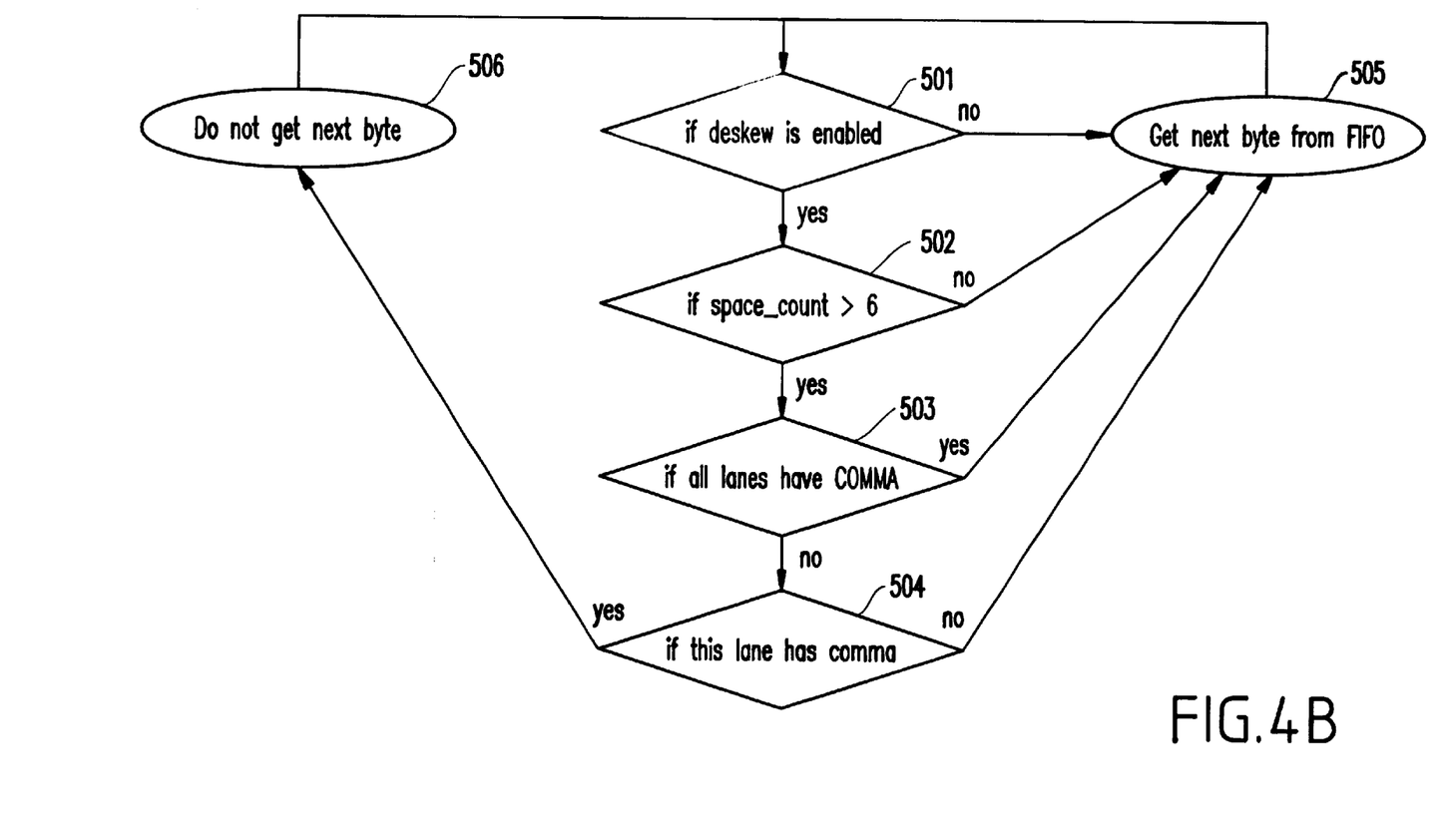

Referring now to FIG. 4b, a flow diagram is shown for a process of determining physical lane skew order in the core 210 as to one data lanes shown in FIG. 4a. The process begins at initial step 501 where determination is made of whether the deskew_enable signal 283 is enabled. If not, the process goes to step 505, wherein all actions that result correspond to an assertion of the get_strobe signal 301 shown in FIG. 4a. Otherwise, the process goes to step 502, which determines whether the space_count latch register 287 is greater than six. If not, the process goes to step 505 again. Next, the process determines whether all lanes 0–n have a "comma" signal present. If affirmative, the process goes to step 505 again. Otherwise, the process goes to step 504 and determines whether the particular lane has a "comma." If not, the process goes to step 505 again and starts the process again. Otherwise when affirmative, all other actions result in step 506, which corresponds to the get_strobe signal 301 being deasserted.

In other words, the process for specific deskew logic counter 275 in this flow diagram provides a maximum allowed skew between any two serial lanes 200 in which a training sequence used to train the unit 260, which is provided by a remote transmitting processor (e.g., an HCA 20) that is at least twice as long as the maximum skew between any two lanes 200. Each of the elastic FIFOs 261 for each physical lane 200 must be capable of containing at least the amount of data representing the maximum skew between any two physical lanes 200. Each of the elastic FIFOs 261 on the receive path must be capable of pausing. The upper link layer logic 250 determines the number of cycles since the beginning of the training sequence on any physical lane 200. The training sequence is generated by the remote transmitting processor (e.g., the processor HCA 20, switch 30, etc.) external to the receiving processor shown in FIG. 2.

The training sequence trains the receiving processor by use of a commonly agreed upon coded sequence for a period of time that is transmitted with the data over the links 25. The upper link layer logic 250 provides control for the logic that pauses an individual elastic FIFO 261 once the number of cycles since the beginning of a training sequence is greater than the maximum amount of skew between any two lanes 200 and the final comma has been received.

The physical lane 200 with the least amount of latency between the attached transmission media 280 and the I/O processor is determined and correct deskew of all physical lanes 200 can be achieved. Therefore, the invention provides a control section 260 having receive buffer devices 261 that compensate for different latencies from at least two physical lanes 200 in data links of parallel-serial architectures so that data transmission occurs at the same time in the processors receive path.

The invention performs a training sequence to correct skew between the physical lanes. The training sequence pauses each of the FIFO buffers at the same point in the training process. Once trained, all buffers are then simultaneously restarted to allow the FIFO buffers to be synchronized in their data transmission.

While the invention has been described in terms of preferred embodiments, those skilled in the art will recognize that the invention can be practiced with modification within the scope of the appended claims.

What is claimed is:

1. A core that compensates for different latencies in data lanes in a parallel-serial architecture, said core comprising:
   a plurality of serial lanes providing data from a transmission media to a processor;
   buffers interposed along each of said serial lanes; and
   training logic connected to said buffers,
   wherein, upon receiving a data communication from said transmission media, said training logic pauses each of said buffers until all of said buffers are synchronized, and
   wherein said training logic simultaneously restarts said buffers after said buffers are synchronized.

2. The core in claim 1, wherein said training logic operates on a training sequence contained within said data communication.

3. The core in claim 2, wherein said training logic includes an AND gate that determines when all of said buffers have reached a predetermined point in said training sequence.

4. The core in claim 3, wherein said training logic stops data processing through each of said buffers until all of said buffers reach said predetermined point in said training sequence, and, when all of said buffers reach said predetermined point in said training sequence, all of said buffers are simultaneously restarted.

5. The core in claim 3, wherein said training sequence includes an initial training sequence identifier and a final training sequence identifier, wherein said final training sequence identifier comprises said predetermined point.

6. The core in claim 5, wherein said training sequence includes a predetermined data stream between said initial training sequence identifier and said final training sequence identifier, wherein said training logic allows each of said buffers to reach said predetermined point only when a training quantity of said data stream has been processed by each of said buffers.

7. The core in claim 6, wherein said training quantity comprises a number greater than a maximum skew value between adjacent ones of said data lanes.

8. A parallel-serial architecture communication system that compensates for different latencies in data lanes of said system, said system comprising:

a parallel-serial transmission media;

a processor in communication with said transmission media;

a plurality of serial lanes providing data from said transmission media to said processor;

buffers interposed along each of said serial lanes; and training logic connected to said buffers, wherein, upon receiving a data communication from said transmission media, said training logic pauses each of said buffers until all of said buffers are synchronized, and wherein said training logic simultaneously restarts said buffers after said buffers are synchronized.

9. The system in claim 8, wherein said training logic operates on a training sequence contained within said data communication.

10. The system in claim 9, wherein said training logic includes an AND gate that determines when all of said buffers have reached a predetermined point in said training sequence.

11. The system in claim 10, wherein said training logic stops data processing through each of said buffers until all of said buffers reach said predetermined point in said training sequence, and, when all of said buffers reach said predetermined point in said training sequence, all of said buffers are simultaneously restarted.

12. The system in claim 10, wherein said training sequence includes an initial training sequence identifier and a final training sequence identifier, wherein said final training sequence identifier comprises said predetermined point.

13. The system in claim 12, wherein said training sequence includes a predetermined data stream between said initial training sequence identifier and said final training sequence identifier, wherein said training logic allows each of said buffers to reach said predetermined point only when a training quantity of said data stream has been processed by each of said buffers.

14. The system in claim 13, wherein said training quantity comprises a number greater than a maximum skew value between adjacent ones of said data lanes.

15. A method of compensating for different latencies in data lanes in a parallel-serial architecture, said method comprising:

receiving a data communication from a transmission media;

providing said data communication to buffers interposed along a plurality of serial lanes;

pausing each of said buffers until all of said buffers are synchronized;

simultaneously restarting said buffers after said buffers are synchronized; and forwarding synchronized data from said buffers to a processor.

16. The method in claim 15, wherein said pausing is based on a training sequence contained within said data communication.

17. The method in claim 16, wherein said pausing includes determining when all of said buffers have reached a predetermined point in said training sequence.

18. The method in claim 17, wherein said pausing stops data processing through each of said buffers until all of said buffers reach said predetermined point in said training sequence, and, when all of said buffers reach said predetermined point in said training sequence, said restarting restarts all of said buffers simultaneously.

19. The method in claim 18, wherein said training sequence includes an initial training sequence identifier and a final training sequence identifier, wherein said final training sequence identifier comprises said predetermined point.

20. The method in claim 16, wherein said training sequence includes a predetermined data stream between said initial training sequence identifier and said final training sequence identifier, wherein said pausing allows each of said buffers to reach said predetermined point only when a training quantity of said data stream has been processed by each of said buffers, wherein said training quantity comprises a number greater than a maximum skew value between adjacent ones of said data lanes.

* * * * *